United States Patent
Kabasawa et al.

[19]

[11] Patent Number: 6,088,202
[45] Date of Patent: Jul. 11, 2000

[54] DEFLECTION LIMITER FOR A FLEXURE SEAT FOR A MAGNETIC DATA TRANSDUCER

[75] Inventors: Hidetoshi Kabasawa, Ogawa-machi; Jun Makabe, Higashimurayama, both of Japan

[73] Assignee: TEAC Corporation, Tokyo, Japan

[21] Appl. No.: 09/153,472

[22] Filed: Sep. 15, 1998

[30] Foreign Application Priority Data

Sep. 24, 1997 [JP] Japan ..................................... 9-276501
Mar. 18, 1998 [JP] Japan ................................... 10-089466

[51] Int. Cl.⁷ ..................................................... G11B 5/48
[52] U.S. Cl. ........................................ 360/245.7; 360/245
[58] Field of Search ....................... 360/99.01, 103–105, 360/109, 128, 245, 245.7

[56] References Cited

U.S. PATENT DOCUMENTS

| | | | |
|---|---|---|---|
| 4,611,257 | 9/1986 | Shiroyama et al. | 360/104 |
| 4,724,500 | 2/1988 | Dalziel | 360/103 |
| 4,972,281 | 11/1990 | Fujioka | 360/105 |
| 5,103,360 | 4/1992 | Maeda | 360/105 |
| 5,222,005 | 6/1993 | Inoue | 360/99.06 |
| 5,333,085 | 7/1994 | Prentice et al. | 360/104 |
| 5,815,349 | 9/1998 | Frater | 360/104 |
| 5,930,079 | 7/1999 | Vera et al. | 360/104 |

*Primary Examiner*—Jefferson Evans
*Attorney, Agent, or Firm*—Woodcock Washburn Kurtz Mackiewicz & Norris LLP

[57] ABSTRACT

A double sided disk drive has a first transducer mounted to a carriage via a flexure seat for data transfer with one recording surface of a disk, and a second transducer mounted via another flexure seat to a carrier arm which in turn is pivoted on the carriage, for data transfer with another recording surface of the disk. An extremely thin piece of sheet metal of biaxial gimbal configuration, the flexure seat supporting the second transducer on the pivotal carrier arm is particularly susceptible to permanent deformation or breakage in the event of a violent swinging of the arm, as when the disk drive is dropped with no disk loaded therein. A deflection limiter is therefore attached to the carrier arm for limiting the deflection of the flexure seat for the second transducer toward the magnetic disk when the transducer is out of data transducing contact with the disk.

6 Claims, 4 Drawing Sheets

DEFLECTION LIMITER FOR A FLEXURE SEAT FOR A MAGNETIC DATA TRANSDUCER

BACKGROUND OF THE INVENTION

The present invention relates to apparatus for data transfer with record media such as flexible magnetic disks, or floppy disks in common parlance. More specifically, the invention deals with improvements in or relating to means for resiliently supporting an electromagnetic transducer in such data transfer apparatus or disk drives.

Disk drives for use with double sided flexible magnetic disks have been known and used extensively as computer peripherals. Typically, as disclosed for example in Shiroyama et al. U.S. Pat. No. 4,611,257, a double sided disk drive comprises a pair of transducers for data transfer with the opposite sides of the disk. One of the transducers is mounted via a flexure seat on a carriage for movement across data storage tracks on the disk. The second transducer is gimbaled via another flexure seat on an carrier arm which in turn is pivotally mounted to the carriage. The carrier arm holds the second transducer spaced from the first recited transducer when no disk is loaded in the disk drive. Upon loading of a disk, then, the carrier arm is sprung to move the second transducer toward the first and hence to cause the two transducers to engage the disk therebetween for data transfer with the recording surfaces on its opposite sides.

As may have been experienced by some users, disk drives may be accidentally dropped from some height, either in use or during handling. Particularly vulnerable to the shock of such a fall is the flexure seat carrying the transducer on the carrier arm. When no disk is loaded in the disk drive, the carrier arm is sprung to, but not locked in, its retracted position, holding the second transducer away from the first, and so is relatively free to oscillate between the retracted and working positions. The flexure seat on the free end of the carrier arm is therefore very easy to be subjected to the full impact of the fall.

As currently fabricated, moreover, the flexure seat is a piece of resilient sheet metal that is as thin as 0.05 millimeter or so. Typically, it has two pairs of opposed U shaped slots cut therein for biaxially supporting the transducer in a gimbal fashion. Its minimal thickness, the two pairs of slots cut therein, and the transducer mounted centrally thereon combine to make the flexure seat all the more susceptible to permanent deformation or destruction as in the event of a fall of the disk drive. The transducer has become incapable of data transfer with the disk when the flexure seat ceases to function normally.

SUMMARY OF THE INVENTION

The present invention seeks, in data transfer apparatus of the kind defined, to most efficaciously protect the flexure seat for a transducer against permanent deformation or breakage for a longer useful life of the apparatus.

The invention also seeks, in attaining the first recited objective, to shield the transducer from noise.

Stated in its perhaps broadest aspect, the invention concerns, in a data transfer apparatus for use with a flexible magnetic disk, the combination comprising support means movable substantially radially of a flexible magnetic disk, a flexure seat of resilient material, a transducer mounted to the support means via the flexure seat for data transfer with the magnetic disk, and a deflection limiter mounted to the carrier arm for limiting the deflection of the flexure seat.

The invention is preferentially applicable to a double sided disk drive that has a first transducer mounted to a carriage via a flexure seat for data transfer with one recording surface of a disk, and a second transducer mounted via another flexure seat to a carrier arm which in turn is pivoted on the carriage, for data transfer with another recording surface of the disk. An extremely thin piece of sheet metal of biaxial gimbal configuration, the flexure seat supporting the second transducer on the pivotal carrier arm is particularly susceptible to permanent deformation or breakage in the event of a violent swinging of the arm, as when the disk drive is dropped with no disk loaded therein. A deflection limiter is therefore attached to the carrier arm for limiting the deflection of the flexure seat for the second transducer toward the magnetic disk when that transducer is out of data transducing contact with the disk.

In one preferred form thereof, the deflection limiter has a flat web disposed in parallel spaced relation to the flexure seat. The web has formed therein an opening to permit the transducer to extend there-through with sufficient clearance to permit normal pivotal motion of the transducer during data transfer with the disk. The deflection limiter of this construction is preferred because, made from a suitable material, it serves also as electromagnetic shield for the transducer, although other constructions are possible as taught herein.

The above and other features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENTS

Figure 1:
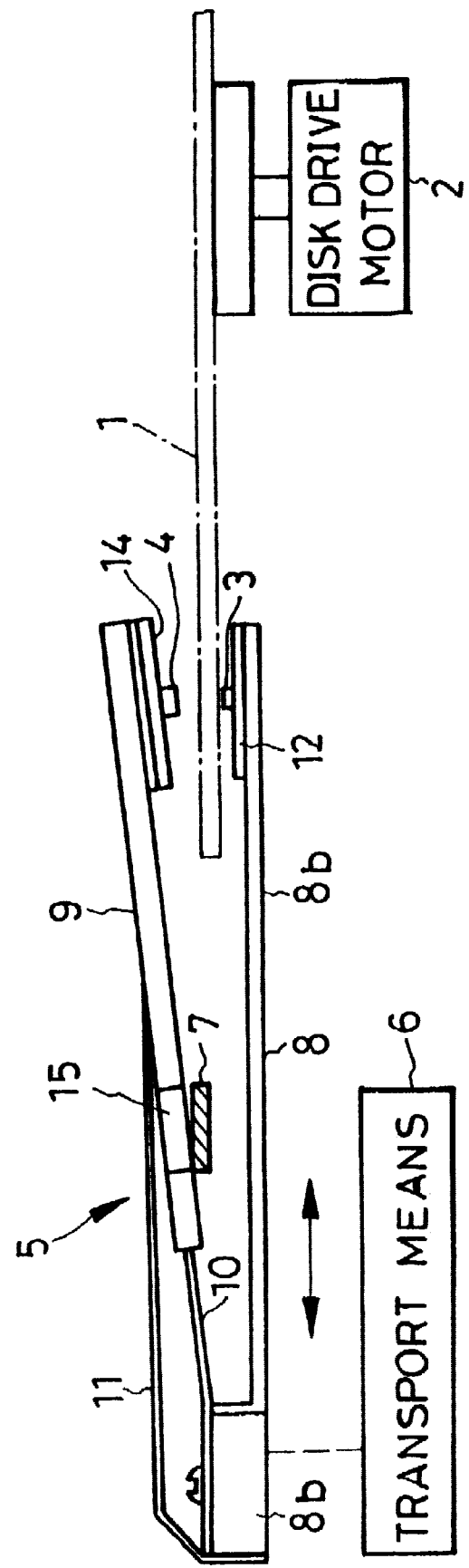
FIG. 1 is a diagrammatic illustration, partly in elevation, partly in section and partly in block form, of those parts of a disk drive which are essential for an understanding of this invention.

The present invention will now be described in detail as embodied in a disk drive for use with a double sided flexible magnetic disk, but only insofar as is necessary for a full understanding of the features and advantages of the invention. With reference first to FIG. 1 the representative apparatus is shown together with the phantom outline of a double sided flexible magnetic disk or disk cartridge 1 loaded therein and held in a preassigned data transfer position. The disk 1 is understood to be conventionally frictionally engaged centrally for rotation by an electric disk drive motor 2.

The disk drive has a first or lower transducer 3 and a second or upper transducer 4 which are disposed generally opposite each other for data transducing contact with the opposite recording surfaces of the disk 1. Both transducers 3 and 4 are supported by support means 5 which are jointly movable across the data storage tracks on the disk 1 by being driven by transport means 6. The transport means 6 can be of any known or suitable design such as that comprising a stepper motor, a lead screw and a guide rail, which are shown in block form because of their conventional and well known nature.

The transducer support means 5 include a carriage 8 having the lower transducer 3 mounted thereto, and a carrier arm 9 pivotally mounted to the carriage via a relatively light cantilever spring 10 and itself having the upper transducer 4 mounted thereto. Slidably engaged with the unshown guide rail, the carriage 8 is movable substantially radially of the disk 1. The modifier "substantially" is used because the traveling direction of the carriage 8, and therefore of the transducers 3 and 4, may or may not be exactly radial with respect to the disk. The cantilever spring 10 energizes the carrier arm 9 counterclockwise as viewed in FIG. 1. However, another, much heavier, cantilever spring 11 is mounted to the carriage 8 for biasing the carrier arm 9 clockwise despite the opposing force of the first recited spring 10.

Figure 2:
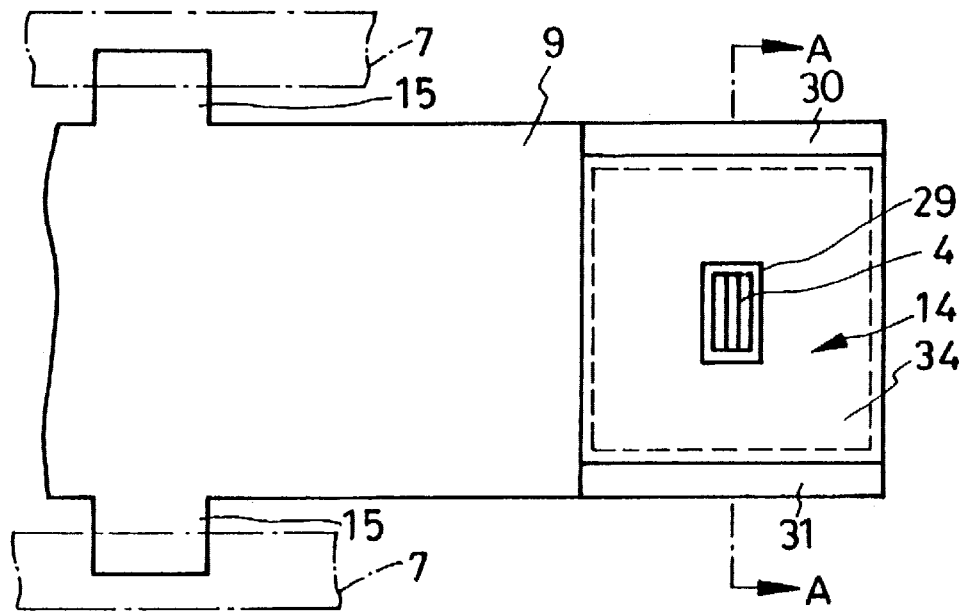
FIG. 2 is an enlarged, fragmentary bottom plan of the carrier arm of the FIG. 1 disk drive, the carrier arm being shown together with the deflection limiter mounted thereto.
Figure 3:
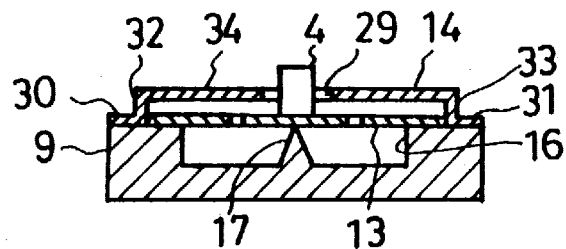
FIG. 3 is a section taken along the line A—A in FIG. 2 and showing the deflection limiter and the flexure seat on the carrier arm.
Figure 5:
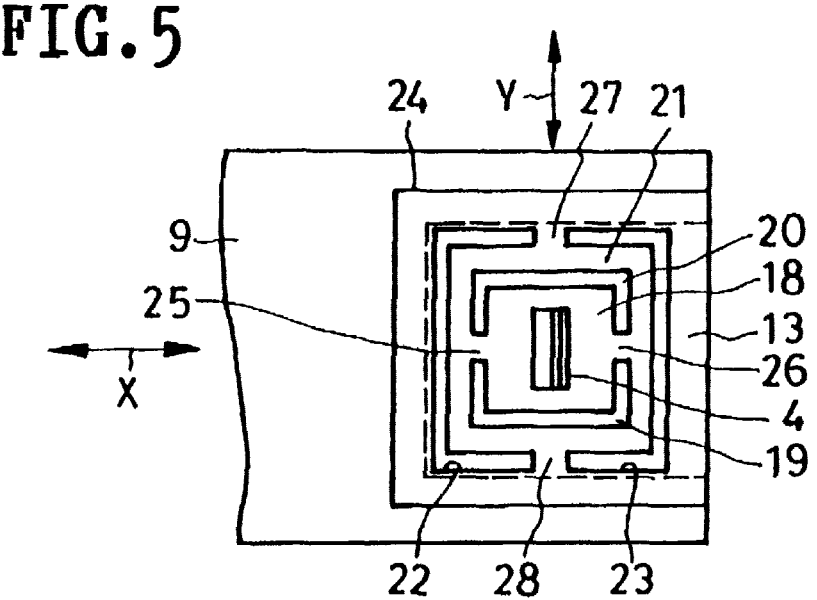
FIG. 5 is a view also similar to FIG. 2 but not showing the deflection limiter.

The lower transducer 3 is mounted to the carriage 8 via a flexure seat 12, and the upper transducer 4 to the carrier arm 9 via another flexure seat 13 seen in FIGS. 3 and 5. The present invention particularly features a deflection limiter, shown at 14 in FIGS. 1–3, which limits the deflection of the upper flexure seat 13.

The carriage 8 is composed of a part 8a of sheet plastic and a part 8b of sheet metal, which constitute in combination what may be regarded for all practical purposes as a rigid body. Alternatively, however, the carriage 8 could be solely of a rigid plastic or a metal.

Preferably molded from a rigid plastic, the carrier arm 9 is proximally coupled to the carriage 8 via the cantilevered leaf spring 10. This spring serves to pivotally support the carrier arm 9, so that the upper transducer 4 on its distal end is movable toward and away from the lower transducer 3.

It is understood that the disk drive is conventionally additionally provided with a cradle, not shown, whereby the disk 1 is carried between the data transfer position of FIG. 1 and an eject position. The cradle has a pair of arm lift fingers 7, FIGS. 1 and 2, extending therefrom into underlying relation to a pair of lugs 15 of the carrier arm 9. The arm lift fingers 7 are to descend from their FIG. 1 position for permitting the carrier arm 8 to turn under the bias of the loading spring 11 and hence to cause both transducers 3 and 4 to engage the disk 1 therebetween. For disk ejection the arm lift fingers 7 are to ascend back to the FIG. 1 position thereby causing the transducers 3 and 4 to disengage the disk.

Figure 4:
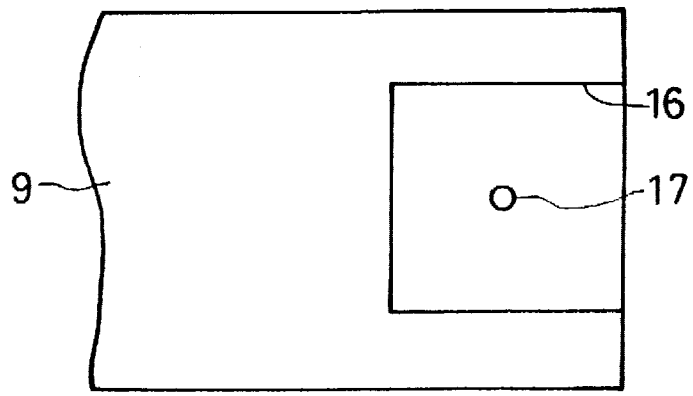
FIG. 4 is a view similar to FIG. 2 but not showing the deflection limiter and the flexure seat.

As will be observed from FIGS. 2–4, the carrier arm 9 has a downwardly open depression 16 of square shape formed in its distal end, and a pivot 17 depending from the center of the top of the depression, in order to enable the flexure seat 13 to support the upper transducer 4 in a gimbal fashion. FIG. 4 indicates that the depression 16 is made open in a direction away from the leaf spring 10, FIG. 1, too, with a view to the reduction of the carrier arm 9 to a minimum in size and weight. Peripherally bonded to the underside of the carrier arm 9, the flexure seat 13 closes the downward opening of the depression 16. The pivot 17 is held against the flexure seat 13 as in FIG. 3.

FIG. 5 best reveals that the flexure seat 13 is a generally square piece of sheet metal with a thickness of, say, 0.05 millimeter. The sheet metal flexure seat has cut therein a first pair of opposed U shaped slots 19 and 20 disposed adjacent the geometric center of the seat, and a second pair of opposed U shaped slots 22 and 23 disposed outwardly of the first pair. The two pairs of slots are angularly offset 90 degrees from each other about the geometric center of the flexure seat 13. There are thus created a central islandlike portion 18, an annular intermediate portion 21 joined to the central portion via a pair of aligned bridges 25 and 26, and an annular marginal portion 24 joined to the intermediate portion via another pair of aligned bridges 27 and 28. The marginal portion 24 has its three sides bonded to the carrier arm 9.

As indicated by the double headed arrows in FIG. 5, the first pair of bridges 25 and 26 are aligned in the X direction, which, incidentally, substantially agrees with a radial direction of the disk 1 in the data transfer position, and the second pair of bridges 27 and 28 in the Y direction at right angles with the X direction. The transducer 4 on the central portion 18 of the flexure seat 13 is therefore biaxially gimbaled, being pivotable on the pivot 17 in both X and Y directions and in any other directions in between.

Figure 6:
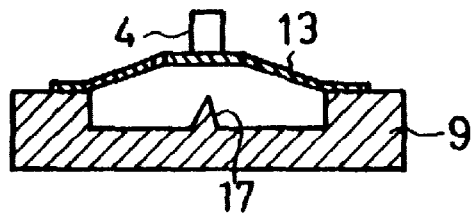
FIG. 6 is a view somewhat similar to FIG. 3 but explanatory of unwanted deflection of the flexure seat in the absence of the deflection limiter according to the invention.

The flexure seat 13 of the foregoing known configuration assures optimal data transducing contact of the transducer 4 with the disk 1. Offsetting this advantage is its low mechanical strength. Assume that the disk drive has fallen off the disk when no disk is loaded therein, with the carrier arm 9 held, therefore, away from the carriage 8 by the arm lift fingers 7. Then the carrier arm 9 will violently swing about the pair of lugs 15. Were it not for the deflection limiter 14 according to this invention, the flexure seat 13, particularly its islandlike central portion 18 carrying the transducer 4, would then deflect away from the pivot 17, as pictured in FIG. 6, to such an extent as to suffer permanent deformation or destruction.

In order to prevent such deflection of the flexure seat 13 beyond the limit of its resiliency, the present invention proposes the use of the deflection limiter 14 best seen in FIGS. 2 and 3. Made from sheet metal, the deflection limiter 14 is formed to include a flat major portion or web 34 of generally square shape, a pair of flanges 32 and 33 bent right angularly from two opposite sides of the web into parallel spaced relationship to each other, and a pair of rims 30 and 31 again bent right angularly and away from each other from the flanges. The deflection limiter 14 is affixed to the carrier arm 9 astride the flexure seat 13, with its pair of rims 30 and 31 bonded to the carrier arm, and its web 34 disposed in parallel spaced relation to the flexure seat. The web 34 has a window 29 cut centrally therein to permit the upper transducer 4 to extend therethrough with sufficient clearance to afford pivotal motion of the transducer in any direction.

The spacing between flexure seat 13 and deflection limiter 14 must be carefully determined in relation to the size of the upper transducer 4. Normally, or when not pressed against the disk 1, the transducer 4 should project out of the window 29 in the deflection limiter 14 to such an extent that the transducer can remain in proper data transducing contact with the disk on being pressed against the same. Also, the spacing should be sufficiently large to allow normal deflections of the flexure seat during data transfer of the transducer with the disk, but sufficiently small to prevent any such deflections of the flexure seat as might result in its permanent deformation or breakage.

As an incidental feature of the invention it is suggested to make use of the deflection limiter 14 as electromagnetic, electrostatic, or magnetic shield, too. Permalloy (trademark for an alloy containing nickel and iron) is a currently preferred material for imparting a shielding effect to the deflection limiter 14, although other materials such as copper or a combination of copper and Permalloy may be employed as well. Made from such materials, the deflection limiter 14 can prevent noise from passing therethrough into the overlying or underlying parts of the transducer 4. Peferably, the flexure seat 13 should also be made from a material capable of imparting a shielding effect thereto, in order to protect the transducer even more positively from noise.

Second Form

Figure 7:
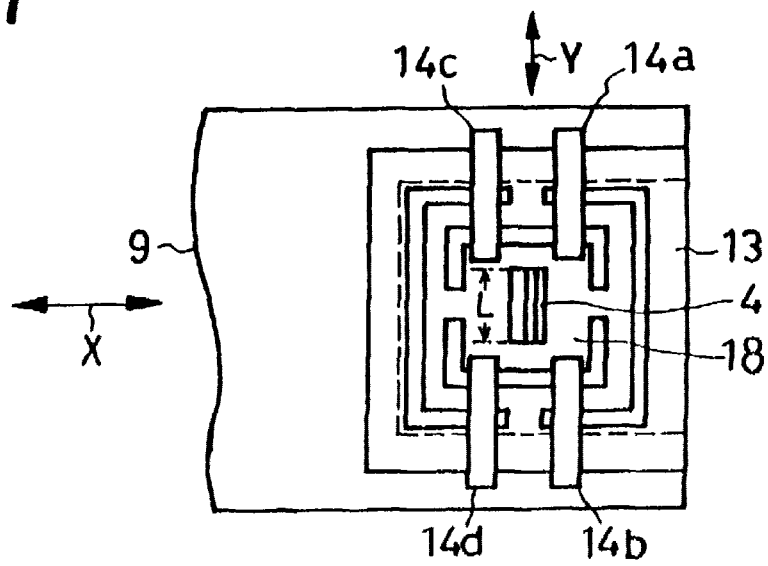
FIG. 7 is a view similar to FIG. 2 but showing another preferred form of deflection limiter according to the invention.
Figure 8:
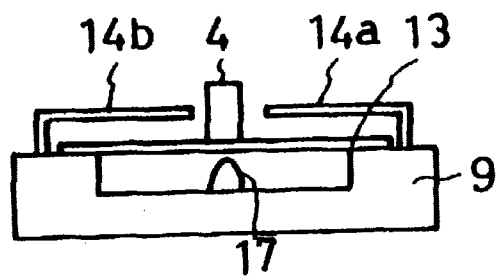
FIG. 8 is a right hand end elevation of the showing of FIG. 7.

The present invention permits use of deflection limiters of various designs other than the generally flat, square shaped plate 14 of the preceding embodiment. FIGS. 7 and 8 show one such other design comprising four L shaped cantilevers 14a, 14b, 14c and 14d each anchored at one end to the carrier arm 9 and another end disposed under, and spaced from, the islandlike central portion 18 of the flexure seat 13. The spacing between cantilevers 14a–14d and flexure seat 13 is the same as that between deflection limiter 14 and flexure seat 13 of the FIGS. 1–5 embodiment. The two cantilevers 14a and 14c are anchored on one side of the flexure seat 13 and extend in the Y direction in parallel spaced relation to each other. The other two cantilevers 14b and 14d are anchored on the other side of the flexure seat 13 and aligned respectively with the cantilevers 14a and 14c Each pair of cantilevers should be spaced from each other, and from the other pair of cantilevers, sufficient distances to permit pivoting of the transducer 4 in any direction on the flexure seat 13.

For ease of assemblage it Is recommended that the two pairs of cantilevers 14a–14d be molded in one piece with the carrier arm 9. In this case, however, the spacing between the two pairs of cantilevers should be made greater than the length L of the transducer 4 in the Y direction, in order that the flexure seat 13 with the transducer mounted thereon may be mounted in position on the carrier arm 9 without being impeded by the preformed cantilevers. Alternatively, the cantilevers might be made from metal or like rigid material and bonded or otherwise affixed to the carrier arm.

Third Form

Figure 9:
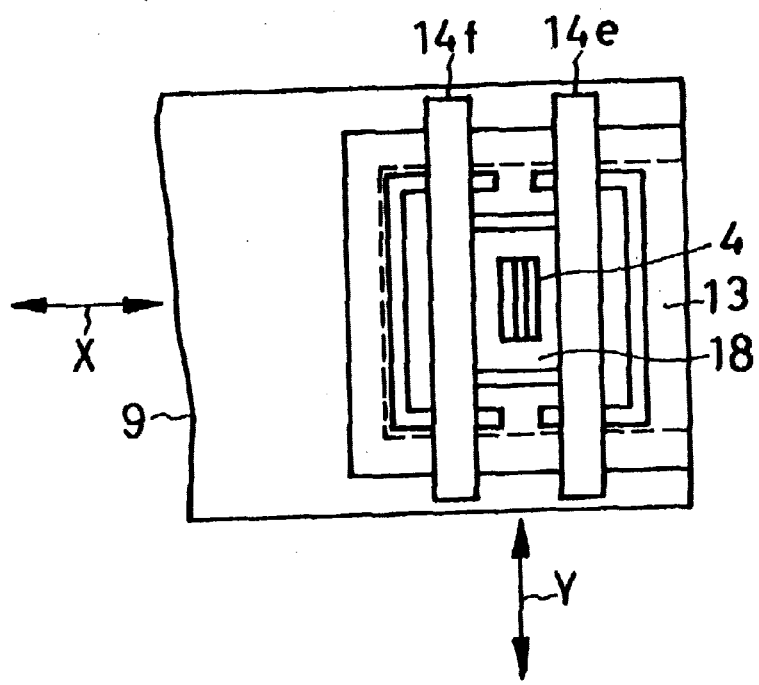
FIG. 9 is a view similar to FIG. 2 but showing still another preferred form of deflection limiter according to the invention.
Figure 10:
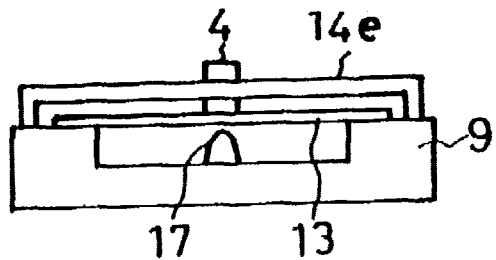
FIG. 10 is a right hand end elevation of the showing of FIG. 9.

FIGS. 9 and 10 illustrate another preferred form of deflection limiter according to the invention, featuring a pair of generally U shaped bridges or beams 14e and 14f mounted astraddle the flexure seat 13 in parallel spaced relation to each other by each having its opposite ends bonded to the carrier arm 9. The beams 14e and 14f extend over parts of the central portion 18 of the flexure seat 13. The spacing between beams 14e and 14f and flexure seat 13 is the same as that between deflection limiter 14 and flexure seat 13 of the FIGS. 1–5 embodiment. The spacing between the beams 14e and 14f should be sufficiently large to permit pivotal motion of the transducer 4 in any direction on the flexure seat 13.

Possible Modifications

Notwithstanding the foregoing detailed description, it is not desired that the present invention be limited by the exact showing of the drawings or the description thereof. The following is a brief list of possible modifications or alterations of the illustrated embodiments which are all believed to fall within the scope of this invention:

1. The sheetlike deflection limiter 14 and flexure seat 13 of FIGS. 1–5 may partly project beyond the free end of the carrier arm 9, by making the carrier arm shorter, in order to that the disk drive may be made less in thickness or height.

2. The sheetlike deflection limiter 14 of FIGS. 1–5 could be bonded to the carrier arm 9 at its three or all sides, instead of two as in FIGS. 2 and 3.

3. The cantilevered deflection limiters 14a–14d of FIGS. 7 and 8 and the bridgelike deflection limiters 14e and 14f of FIGS. 9 and 10 could extend in the X direction.

4. The cantilevered deflection limiters 14a–14d of FIGS. 7 and 8 could be more or less in number.

5. The bridgelike deflection limiters 14e and 14f of FIGS. 9 and 10 could be molded in one piece with the carrier arm 9.

What is claimed is:

1. In a data transfer apparatus for use with a flexible magnetic disk, in combination:

(a) a carriage movable substantially radially of a flexible magnetic disk;

(b) a carrier arm pivotally mounted to the carriage for joint movement therewith relative to the magnetic disk;

(c) a flexure seat of resilient material;

(d) a transducer mounted to the carrier arm via the flexure seat for movement, with the pivotal motion of the carrier arm relative to the carriage, into and out of data transducing contact with the magnetic disk, the flexure seat being subject to deflection approximately toward the magnetic disk when the transducer is out of data transducing contact with the magnetic disk; and (e) a deflection limiter mounted to the carrier arm for limiting the deflection of the flexure seat toward the magnetic disk when the transducer is out of data transducing contact with the magnetic disk, wherein the deflection limiter has a plurality of cantilevers each anchored at one end to the carrier arm and having another end disposed adjacent central part of the flexure seat.

2. In a data transfer apparatus for use with a flexible magnetic disk, in combination:

(a) a carriage movable substantially radially of a flexible magnetic disk;

(b) a carrier arm pivotally mounted to the carriage for joint movement therewith relative to the magnetic disk;

(c) a flexure seat of resilient material, wherein the flexure seat is a gimbal seat having a biaxially supported central portion on which the transducer is mounted, and wherein the deflection limiter has two pairs of cantilevers anchored each at one end to the carrier arm on two opposite sides of the flexure seat, the cantilevers having other ends disposed adjacent the central portion of the flexure seat;

(d) a transducer mounted to the carrier arm via the flexure seat for movement, with the pivotal motion of the carrier arm relative to the carriage, into and out of data transducing contact with the magnetic disk, the flexure seat being subject to deflection approximately toward the magnetic disk when the transducer is out of data transducing contact with the magnetic disk; and (e) a deflection limiter mounted to the carrier arm for limiting the deflection of the flexure seat toward the magnetic disk when the transducer is out of data transducing contact with the magnetic disk.

3. The data transfer apparatus of claim 2 wherein the two pairs of cantilevers are molded in one piece with the carrier arm, and wherein the two pairs of cantilevers have said other ends thereof spaced from each other a distance longer than a length of the transducer in a direction in which said other ends of the cantilevers are spaced.

4. In a data transfer apparatus for use with a flexible magnetic disk, in combination:

(a) a carriage movable substantially radially of a flexible magnetic disk;

(b) a carrier arm pivotally mounted to the carriage for joint movement therewith relative to the magnetic disk;

(c) a flexure seat of resilient material;

(d) a transducer mounted to the carrier arm via the flexure seat for movement, with the pivotal motion of the carrier arm relative to the carriage, into and out of data transducing contact with the magnetic disk, the flexure seat being subject to deflection approximately toward the magnetic disk when the transducer is out of data transducing contact with the magnetic disk; and (e) a deflection limiter mounted to the carrier arm for limiting the deflection of the flexure seat toward the magnetic disk when the transducer is out of data transducing contact with the magnetic disk, wherein the deflection limiter has a pair of bridges anchored each at both ends thereof to the carrier arm on opposite sides of the flexure seat and extending in parallel spaced relation to each other.

5. A data transfer apparatus for use with a flexible magnetic disk having magnetic recording surfaces on both sides thereof, the apparatus comprising:

(a) disk drive means for imparting rotation to a flexible magnetic disk;

(b) a carriage;

(b) carriage drive means for moving the carriage substantially radially of the magnetic disk;

(d) a first transducer mounted to the carriage for movement therewith in data transducing contact with one recording surface of the magnetic disk;

(c) a carrier arm pivotally mounted to the carriage for joint movement therewith relative to the magnetic disk;

(f) a flexure seat of resilient material;

(d) a second transducer mounted to the carrier arm via the flexure seat for movement, with the pivotal motion of the carrier arm relative to the carriage, into and out of data transducing contact with another magnetic recording surface of the magnetic disk, the flexure seat being subject to deflection approximately toward the magnetic disk when the second transducer is our of data transducing contact with the magnetic disk; and (e) a deflection limiter mounted to the carrier arm for limiting the deflection of the flexure seat toward the magnetic disk when the second transducer is out of data transducing contact with the magnetic disk, the deflection limiter having a web disposed in parallel spaced relation to the flexure seat, the web having formed therein an opening to permit the transducer to extend therethrough with clearance.

6. The data transfer apparatus of claim 5, wherein the deflection limiter is of a material such that the deflection limiter serves also as shield for the transducer.

* * * * *